(12) United States Patent
Dyer

(10) Patent No.: US 12,277,538 B2
(45) Date of Patent: Apr. 15, 2025

(54) SELF-SERVICE PRINT KIOSK

(71) Applicant: Kevin M Dyer, Palmer, AK (US)

(72) Inventor: Kevin M Dyer, Palmer, AK (US)

( * ) Notice: Subject to any disclaimer, the term of this patent is extended or adjusted under 35 U.S.C. 154(b) by 0 days.

(21) Appl. No.: 18/654,399

(22) Filed: May 3, 2024

(65) Prior Publication Data

US 2024/0370841 A1 Nov. 7, 2024

Related U.S. Application Data

(60) Provisional application No. 63/463,571, filed on May 3, 2023.

(51) Int. Cl.
*G06Q 20/18* (2012.01)
*G06F 3/12* (2006.01)

(52) U.S. Cl.
CPC ............ *G06Q 20/18* (2013.01); *G06F 3/1203* (2013.01); *G06F 3/1258* (2013.01); *G06F 3/1287* (2013.01)

(58) Field of Classification Search
CPC .... G06F 3/1287; G06F 3/1258; G06F 3/1203; G06Q 20/18
See application file for complete search history.

(56) References Cited

U.S. PATENT DOCUMENTS

| | | | |
|---|---|---|---|
| 7,599,854 B1 * | 10/2009 | Baum | G06Q 30/02 705/26.1 |
| 7,839,521 B2 | 11/2010 | Bard et al. | |
| 9,501,769 B2 | 11/2016 | Guerin et al. | |
| 10,893,154 B2 | 1/2021 | Kline | |
| 2003/0038835 A1 | 2/2003 | DeFelice | |
| 2004/0090468 A1 * | 5/2004 | Cruikshank | H04N 1/3871 715/838 |
| 2007/0229678 A1 * | 10/2007 | Barrus | H04N 1/32128 |
| 2009/0086240 A1 | 4/2009 | Kim | |
| 2013/0117137 A1 * | 5/2013 | Klein | G07F 17/26 705/16 |
| 2013/0258361 A1 * | 10/2013 | Qian | G06F 3/1285 358/1.9 |
| 2018/0222680 A1 * | 8/2018 | Hershkovitz | B65G 43/08 |
| 2019/0356788 A1 * | 11/2019 | Oh | G06Q 30/0641 |
| 2021/0406854 A1 * | 12/2021 | Clemson | B65C 9/40 |

* cited by examiner

Primary Examiner — John R Wallace

(57) ABSTRACT

A self-service point-of-sale kiosk is provided with a printer and access to a database (on-site or remote) with images that can be selected and printed on-demand. The consumer can search the database at the kiosk via an interactive display (user interface "UI") disposed on the enclosure of the kiosk or via a mobile app or website. One or more images from the database can be selected at the UI and printed, rolled, and packaged within the enclosure of the kiosk. Alternately, the user can upload an image to the memory of the kiosk via a port on the enclosure or via Internet connection. The packaged image is dispensed out of the kiosk to the user within minutes. Payment for the printed image can be processed at the kiosk as well, or via an Internet connection to the kiosk service system.

20 Claims, 16 Drawing Sheets

SELF-SERVICE PRINT KIOSK

PRIORITY CLAIM AND CROSS-REFERENCE TO RELATED APPLICATION

This application claims the benefit under 35 U.S.C. § 119(e)(1) of U.S. Provisional Application No. 63/463,571, filed May 3, 2023, which is hereby incorporated by reference in its entirety.

BACKGROUND

Posters with art, photographs, and other designs are popular decoration items. Some posters highlight movies past or present or advertise for upcoming theatrical releases, concerts, or other events. Other posters highlight musical performers or groups, sports personalities or teams, and many others have depictions of cars, celebrities, fantasy scenes, vacation destinations, other scenic locations, and so forth.

Generally, consumers wishing to purchase posters either order them online or visit retail locations that sell posters. While online sources can potentially have a significantly greater selection than physical retail locations, the consumer must wait for the arrival of the poster after ordering (which can take days to weeks in some cases), and also takes various risks with the transaction, including that the poster will arrive undamaged, that the poster will look like the image online, that the poster will be a high-quality print, and that the poster will actually be available as advertised online. Buying a poster from a physical retail location can mitigate some of these risks, but retail locations typically have much fewer options to select from. For instance, most retail locations with pre-printed posters have less than 30 to 50 options. Even with shops that stock a larger selection of posters, if a poster is popular, there is a risk that the retail location may be sold out of the poster, with potentially long delays in restocking. For the consumer looking to buy a particular poster at a physical retail location, the chances that the poster will be available to purchase are much less than purchasing online.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions shown in the illustrations of the figures are for example, and other shapes and or dimensions may be used and remain within the scope of the disclosure, unless specified otherwise.

DETAILED DESCRIPTION

Overview

Figure 1:
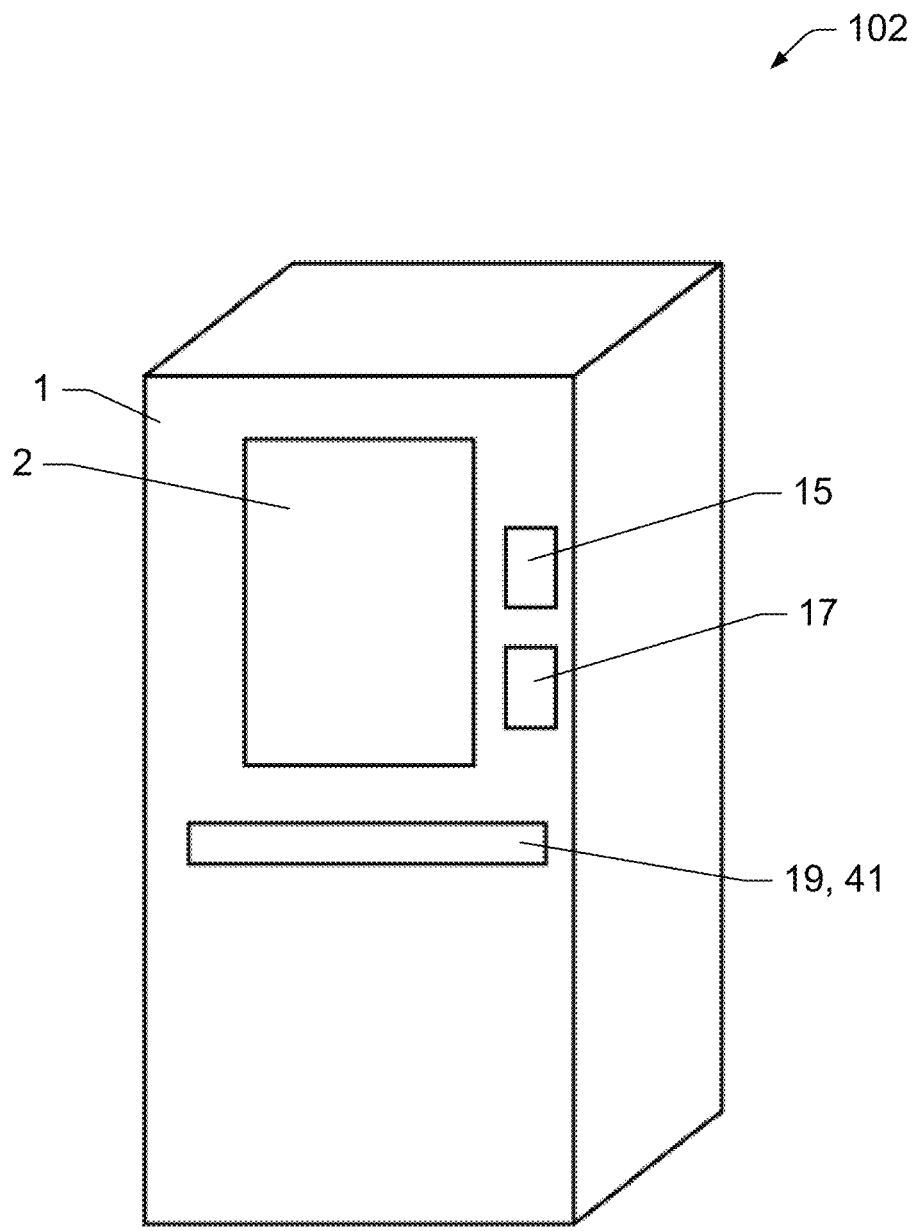
FIG. 1 shows a perspective view of an example print kiosk exterior view, according to an implementation.

The present disclosure includes a printed image (e.g., poster) sales and distribution system that is comprised of one or more secure centralized servers and secure local distributed machines (e.g., print kiosks) that facilitate the distribution of printed images by providing a user-friendly interface wherein poster images are selected, purchased, printed, packaged, and immediately dispensed in real-time to the consumer.

Poster sized paper prints have wide consumer demand. Tens of millions of posters, maps, signs, bulletins, etc. are produced and sold to consumers and businesses every year. Poster sales, distribution, dispensing displays widely exist as stand-alone racks positioned at conventional brick-and-mortar retail and poster specialty stores. Currently, brick-and-mortar stores dominate the poster distribution landscape. However, consumers want their posters on demand. Although stocking multiple units and varieties of each poster, brick-and-mortar stores cannot physically stock in the entire universe of millions of poster images available. Retail locations can have a poster bin with a few options to choose from, which can range from 10-30 poster options.

Internet-based poster ordering services are also available. However, Internet-based poster ordering services are unable to timely meet the demands of consumers for products that they need on short notice. In addition, these Internet-based poster ordering services typically add shipping, handling, and packaging charges that add significantly to the cost of a poster. New copyrighted poster releases that are trending in the entertainment business can take weeks to make it through the supply chain and by the time those posters are available, the excitement of the "new-release" has begun to wane and a revenue opportunity is lost.

There are also print centers where consumers can print large format images from physical electronic storage media that they bring with them or send via email. However, due to the economy of scale/sales volume of these large format prints, the cost may be prohibitive for the average consumer. Also, there is typically an order queue that can be days long as the consumer waits for a qualified technician to do their print job. Another issue that works against the print center model is copyright licensing. Either the staff of self-service stores must act as the enforcer of copyright law.

The foregoing issues indicate that there is a tremendous market potential for this business model by not only increasing the access, economy, and convenience of poster-sized printed material for consumers, but also, creating revenue opportunities for the creators of poster sized content and protecting copyrights via a secure distribution system that is widely accessible.

The system as described herein dramatically improves upon the present poster sales, distribution, dispensing methods found in the current marketplace. The instant disclosure provides for thousands to millions of poster options for a consumer to choose from for purchase on-site. A self-service point-of-sale print kiosk is provided with a high-quality color printer (e.g., laser, inkjet, etc.) and access to a database (on-site or remote) with images that can be selected and printed on-demand. The consumer can search the database at the kiosk via an interactive display (user interface "UI") disposed on the enclosure of the kiosk or via a mobile app or website. One or more images from the database can be selected at the UI and printed, rolled, and packaged within the enclosure of the kiosk. Alternately, the user can upload an image to the memory of the kiosk via a USB port, or the like, on the enclosure or via network/Internet connection. The packaged image is dispensed out of the kiosk to the user within minutes. Payment for the printed image can be processed at the kiosk as well, or via an Internet connection to the kiosk service system.

The disclosed print kiosk includes an on-board and/or networked database and a point-of-sale device on the enclosure. A consumer can search through image selections via the UI (e.g., a touch screen) from multiple licensed and unlicensed images while on-site or can search via an Internet connection. The consumer can select different media options and print them at the kiosk. This opens the variety of options to a user for instant purchase. Media can come in many sizes, and include large posters having a size of 24"×36" and other poster sizes.

The kiosk can be built with enclosed storage for holding multiple rolls of printing stock and containers of ink or toner for high capacity printing. The kiosk includes all of the hardware, firmware, and software (including Wi-Fi/Internet connection) for on-site payment processing, selection of product, printing images (e.g., posters), rolling and packaging the images, and dispensing to the user. A unique feature includes online access to the kiosk service system through a mobile app or website for uploading art to be printed at a local kiosk. Software to prevent unauthorized printing of copyrighted materials can be included.

Also unique is the ability to print and dispense large high-quality full-color posters at the print kiosk. The printer paper is provided in large rolls for large prints (at least 24"×36"), and the printer is wide enough to accommodate the large printing size as well. As the printer paper passes through the printer and is printed on, the paper exits the printer and the print toner or ink is cooled and dried so that the print can be rolled on exit from the printer. Rolling the printed image with the ink or toner still wet on the paper would result in unacceptably low quality prints. With the ink or toner dry and cured, the printed image is rolled into a tube-shape and packaged in a shrink-wrapper for dispensing to the user. Thus, the dispensed product is a high-quality full-color printed image (e.g., poster) comparable to the pre-printed poster products available at retail locations. The shrink-wrapped printed image can be handled without damage to the high-quality print.

The enclosure of the print kiosk includes the printer, the paper, cutters for the paper and wrapper, a cooling system for drying the ink or toner, a rolling system for rolling printed images, a wrapping system for shrink-wrapping the rolled images, and a dispensing system for delivery to the user. The enclosure also includes a processor, memory, network adapter, and interactive display (UI). The enclosure includes the associated hardware, firmware, and software to support each of the other mentioned systems, as well as off-site server, data storage, and communication (e.g., network, Internet, etc.) systems.

While the system may be described herein with reference to a digital poster distribution system, an application to which the system is designed to perform, it will be readily apparent that the system is not limited to that application and can be employed in printed material sales, distribution, dispensing systems used to distribute a wide variety of printed materials. The system incorporates robust, secure, scalable software that provides a fully personalized user experience and real-time feedback to the consumer. In addition, the customer interface can be localized for each purchase experience by allowing the consumer to choose the language that the user interface displays. Thus, making communication with the system clear and unambiguous.

Techniques and devices are discussed with reference to example poster printing as illustrated in the figures. However, this is not intended to be limiting, and is for ease of discussion and illustrative convenience. The techniques and devices discussed may be applied to any and all printing, embossing, custom imaging services, and the like, and remain within the scope of the disclosure. For the purposes of this disclosure, the generic term "printing" is used to indicate any or all of the above.

Further, the shape and quantity of the components illustrated in the figures may vary to accommodate the various possible applications. In alternate embodiments, fewer, additional, or alternate components may be used and/or combined to form a print kiosk having an equivalent or similar function and operation.

Implementations are explained in more detail below using a plurality of examples. Although various implementations and examples are discussed here and below, further implementations and examples may be possible by combining the features and elements of individual implementations and examples.

Example Print Kiosk

An example print kiosk 102 is shown at FIG. 1. As shown on the exterior, the kiosk 102 includes an enclosure 1, an interactive display 2, a media port 15, a point-of-sale pad 17, and a disbursement chamber 19 with delivery chute 41. The enclosure 1 houses all of the components of the print kiosk 102, so that the print kiosk 102 is fully self-contained. In other words, the enclosure encases the printer 5, the paper 14, cutters 50 and 36 for the paper and wrapper, a cooling system 8 for drying the ink or toner, a rolling system 10 for rolling printed images, a wrapping system 37 for shrink-wrapping the rolled images, and a dispensing system 19 for delivery to the user, as well as many other components. The enclosure 1 also includes a processor 4, memory 40, network adapter 3, and interactive display (UI) 2. The enclosure 1 includes the associated hardware, firmware, and software to support each of the other mentioned systems, as well as off-site server, data storage, and communication (e.g., network, Internet, etc.) systems.

Figure 2:
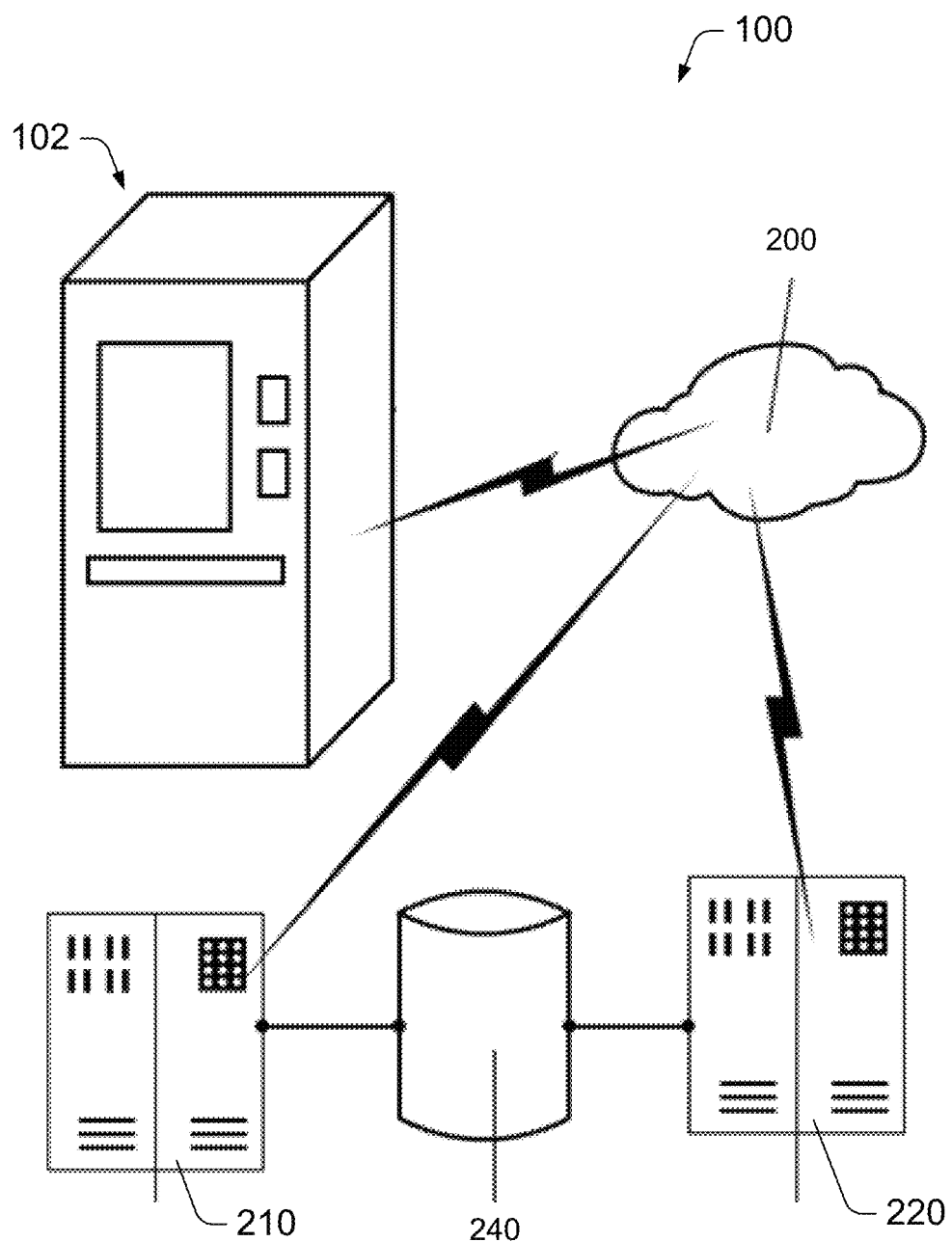
FIG. 2 shows an example print kiosk system, according to an implementation.

In various implementations, the kiosk 102 is part of an example print kiosk system 100, as shown at FIG. 2. The system 100 includes one or more print kiosks 102, one or more servers 210 and 210, and one or more databases 240. The print kiosks 102 can be networked to one or more of the other components of the system 100 via the Internet, WiFi networking, cell or mobile phone networking, LAN or WAN networking, and so forth. More than one networking technique may be employed in the system 100. Some or all of the components of the system 100 can also be connected to the Internet 200, cloud computing, cloud storage, and so forth. The system 100 allows a storage of images to be distributed in one or more locations (i.e., cloud storage, servers 210 and 210, databases 240, etc.) for an extensive and expandable library of images that is accessible to one or more of the kiosks 102.

Additionally, the networking of the system 100 allows for quick provisioning, setup, and updates of new and existing kiosks 102, as well as payment processing, web and app-based ordering, and other networked communications and transactions.

Figure 3:
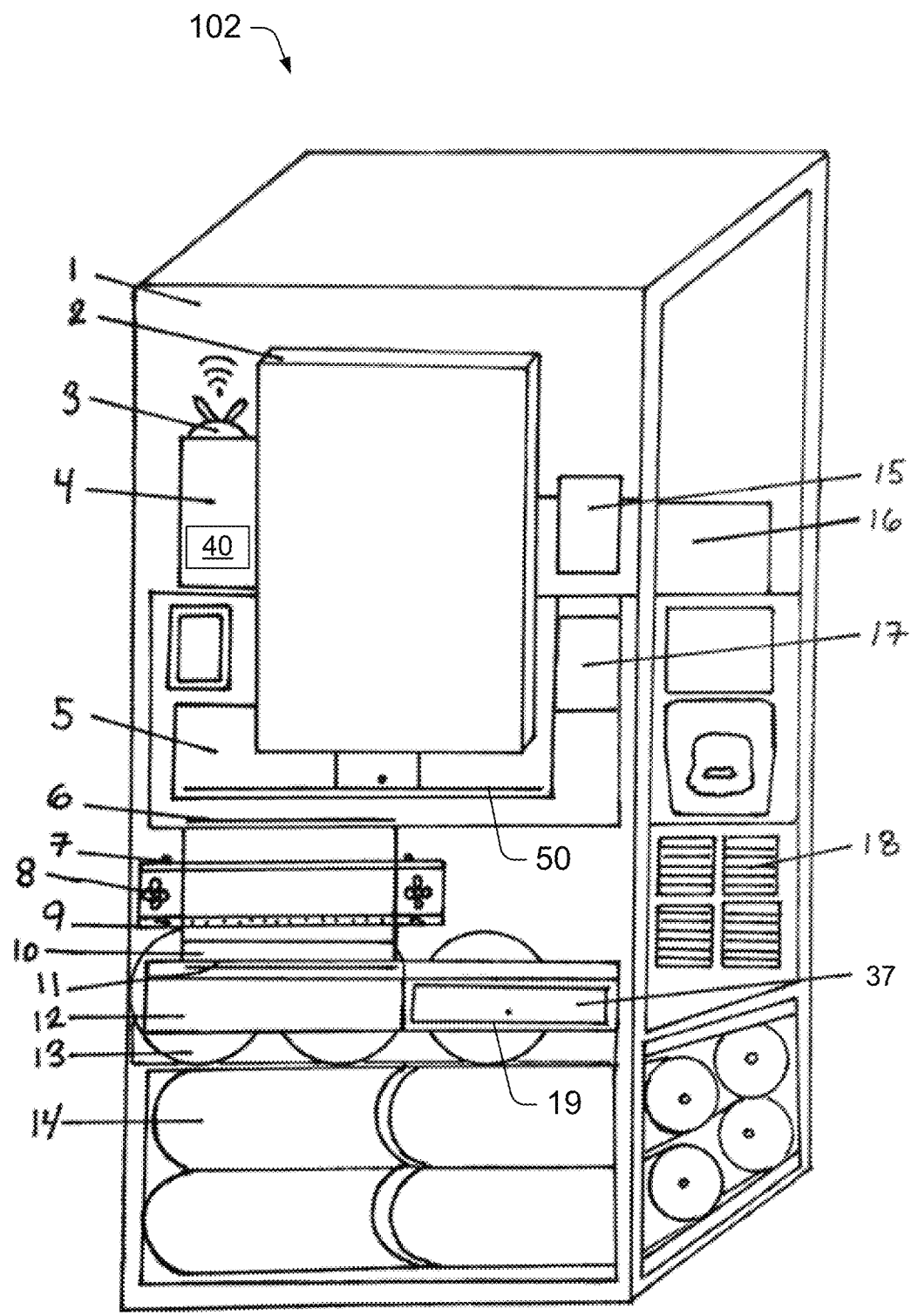
FIG. 3 shows a perspective view of an example print kiosk component arrangement, according to an implementation.

FIG. 3 shows a view of an example arrangement of components of the print kiosk 102. The arrangement includes: enclosure 1, interactive display 2, network adapter 3, processor 4, memory 40, printer 5, printer cutter 50, printer mouth/print path 6, optical sensors 7, cooling system/fans 8, cooling/drying plenum 9, roller guide track 10, packager entry 11, packager 12, high-capacity tube stock 13, high-capacity paper stock/racking system 14, media input port 15, high-capacity ink/toner storage 16, point-of-sale system pad 17, cooling vents 18, wrapper system 37, and disbursement chamber 19. In various embodiments, a print kiosk 102 may have additional, alternate, or fewer components, and remain within the scope of the disclosure—providing the same or similar functionality.

The following description provides support for the various functions of the example print kiosk 102 and the system 100. The description is formatted in a flow process (FIGS. 4A-4D) for ease of understanding, however, it is not intended to be limiting. Not all steps in the flow process are necessary and the order of the process steps may be rearranged to accommodate various embodiments. Further, the processes described with respect to FIGS. 4A-4D may also describe a corresponding apparatus, structure, system, or the like. In alternate implementations, other techniques may be included in the processes in various combinations, and remain within the scope of the disclosure.

The process is also described in terms of actions generally related to the user (e.g., customer), related to the kiosk, related to a kiosk app (for example), related to a server, related to the printer 5 of the kiosk, and related to the packager 12 and its associated components.

Figure 4A:
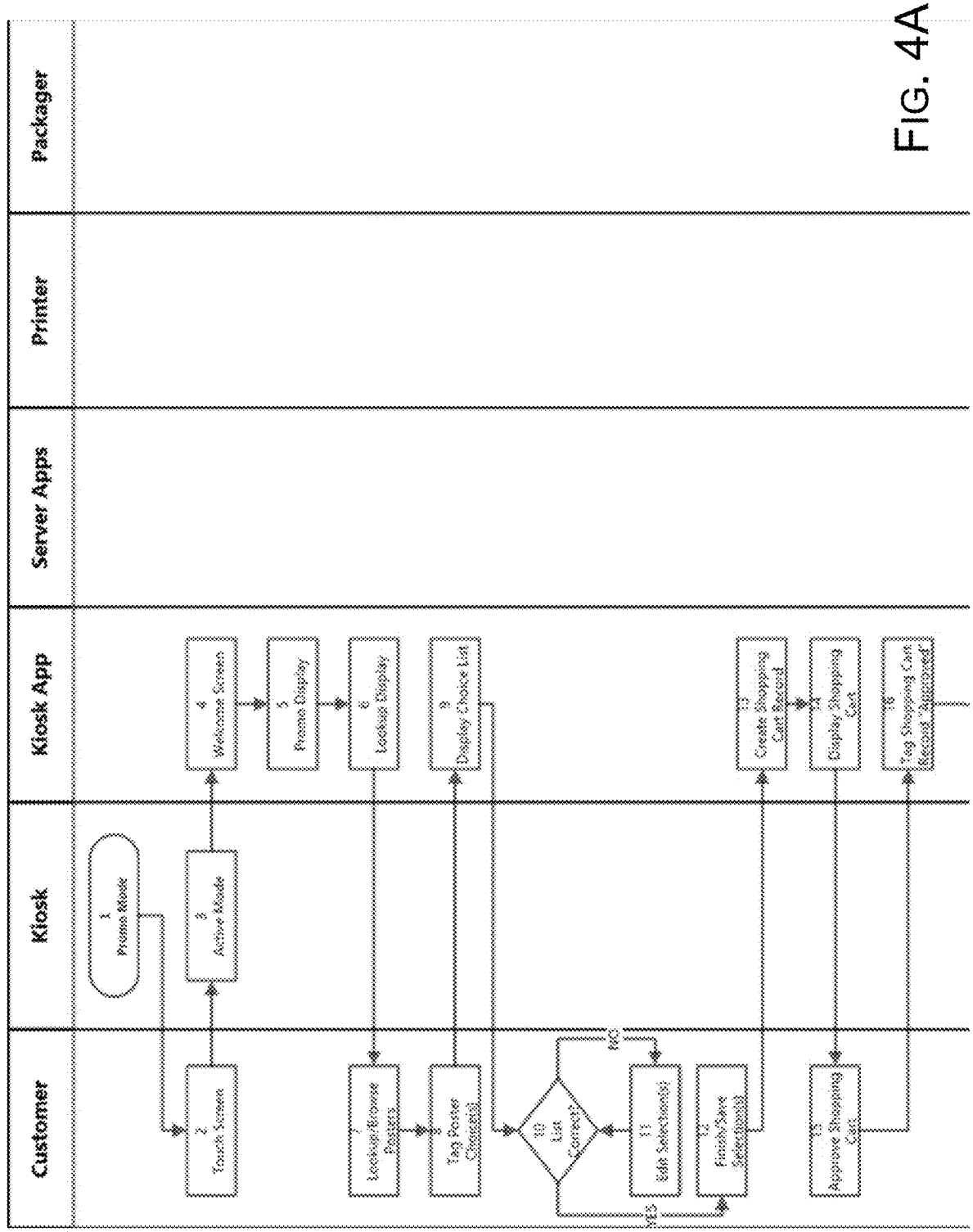
FIGS. 4A-4D show a flow diagram of an example print sequence, according to an implementation.

For example, referring to FIG. 4A, block 1 describes a Promo Mode. At this step, the kiosk 102 is in a "promo mode." In this mode the kiosk 102 displays promotional media at the interactive display 2 to attract customers. The kiosk 102 can also include a speaker or transducer to play sounds, music, or other attractive audio.

Block 2 describes an action at the interactive display 2. The user can activate the interactive display 2, for instance by touching it (if it is a touch screen) or pushing a button, etc. The processor 4 of the kiosk 102 receives the input and changes the mode from Promo to Active.

Block 3 describes Active Mode. Active mode initiates a login process to the network server 210 and begins a Welcome Sequence. Block 4 describes the Welcome Screen. At this step, the interactive display 2 displays a brief welcome message. Block 5 describes a Promo Display. At this step, the interactive display 2 displays a Promo Screen that promotes items that are Best Seller and Trending Posters that are currently popular.

Block 6 describes Display Lookup, Filter, and Sort functions. At this step, after a certain period of time, the interactive display 2 will display a screen that shows the customer how to look up filter, sort, and browse image (e.g., poster) choices. Block 7 describes a process for lookup/browsing image(s). The customer can use the interactive display 2 to browse and choose the images that they are interested in. The interactive display 2 will also allow the user to expand the view of an image to the full area of the Kiosk screen.

Block 8 describes a process of Tagging image choice(s). In this step, a user can use the interactive display 2 to "tag" that image. This can include selecting the image shown at the interactive display 2 by touching the interactive display 2 or another input device at the kiosk 102. The user can tag multiple images for printing and designate the quantities of each image. Block 9 describes Displaying a Choice List. The interactive display 2 will display the list of "Tagged" images, quantities, prices, extensions, and the total for the order. Block 10 requests confirmation of the order. The interactive display 2 displays the query "Is the List of Posters Correct?" The user can audit the image list for correctness, using the interactive display 2 or other input device at the kiosk 102 (e.g., touchpad, buttons, etc.). At block 11, the user can edit image selections. The user can edit the choice of images and the quantities of those that have been chosen.

Block 12 describes Finishing/Saving image selection(s). With the list of images finalized, the user can "Save" the list. Block 13 describes Creating a Shopping Cart. When the "Save" function is clicked, the processor 4 will create a Shopping Cart record in the memory 40 (e.g., a local database) and/or a remote database 240. Block 14 describes Displaying the Shopping Cart. With the Shopping Cart record created, the interactive display 2 displays the Shopping Cart data for final approval by the user. At block 15, the user has the opportunity to approve the Shopping Cart. The user uses the interactive display 2 to "Approve" the transaction displayed in the Shopping Cart. This can be done on-screen or using one or more input tools. At block 16 the processor 4 tags the Shopping Cart Record "Approved" for processing to print. When the user approves the Shopping Cart, the local Shopping Cart record will be tagged as "Approved".

Figure 4B:
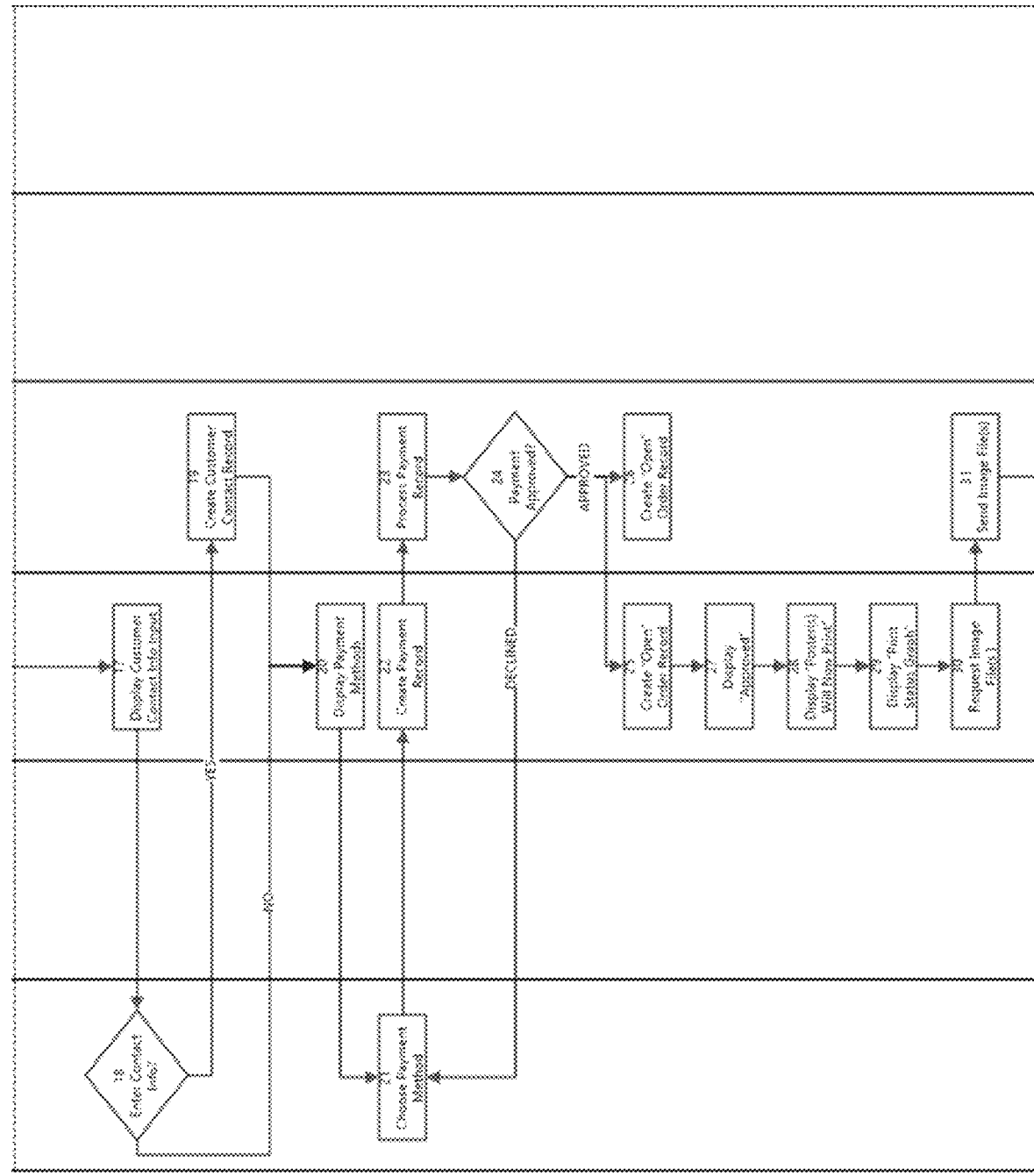

Referring to FIG. 4B, at block 17 the interactive display 2 displays the "Input Customer Contact Info" Window. Before payment is taken, the interactive display 2 opens a window that offers the customer the option to create an account and save their contact information for future communication. Block 18 describes the customer choice to enter Contact Info into the local or remote database 240. The customer either opts-in or opts-out to disclose their contact info. At block 19 the customer can Opt-In on Contact Info. If the customer enters their contact information, a Customer Contact record is created.

Block 20 describes displaying Payment Methods. After the customer opts in or opts out of the contact info screen the interactive display 2 will display the available payment methods. At block 21 the user is prompted to choose a Payment Method. The customer will choose an electronic payment method from the list provided and the customer will enter the payment data by swiping/tapping a payment card on the Kiosk's payment card interface 17, select another electronic payment choice such as PayPal, Venmo, etc. At block 22 the processor 4 will create a Payment Record in memory 40 and/or the remote database 240. The processor 4 will compile a Payment Record from the data entered by the customer and transmit that record to the Payment Processing Server 210.

At block 23 the Payment Processing Server 210 Processes the Payment. The Payment Processing Server 210 will process the payment data with the corresponding payment processor. At block 24 the interactive display 2 will show that the payment is Approved/Decline Payment via Payment Processor. The Payment Processing Server 210 will submit the payment for processing. If the payment is approved by the payment processor, then the Payment Processing Server 210 will send an "Approved" tag to the Transaction Record on the Centralized Transaction Server 210 and to the processor 4 of the Kiosk 102. If the payment is declined, then the Transaction Server 210 will send a "Declined" message to the Kiosk 102 and the interactive display 2 will return to the Choose Payment Method screen.

Block 25 describes creating an Open Order Record on The Transaction Server 210. When a transaction is "Approved" the Centralized Transaction Server 210 will store a transaction record with the status of "Open". Block 26 describes creating an Open Order Record at the memory 40 of the Kiosk 102. When a transaction is "Approved" the Centralized Transaction Server 210 will send an order record with the status of "Open" to the Kiosk 102. This event will also trigger block 27. At block 27 the interactive display 2 will show Payment Success and Display: "Approved! Thank you!" When the Kiosk 102 receives the approved transaction record from the Transaction Server 210 the interactive display 2 will display a message saying: "Approved! Thank You!"

At block 28, display: "Your Image Will Now Be Printed". After the "Approved! Thank You" message, the interactive display 2 will display the message: "Your Image(s) Will Now Be Printed". Block 29 discusses displaying the Poster Print Status Screen. While the Image(s) are printing, the interactive display 2 can display a status graph and promotional items on the screen.

Block 30 discusses requesting Image Files to Kiosk 102. The processor 4 of the Kiosk 102 will send a request to the Centralized Image Server 220 for the files needed to fulfill the order. At block 31 the requested image files are sent to the Kiosk 102. The Centralized Image Server 220 will send the encrypted image file(s) for the order to the processor 4 of the Kiosk 102 for processing. Alternately, the processor 4 will retrieve image file(s) from memory 40 that have been uploaded by the user to the memory 40. The user may use the media input 15 to upload files, by inserting a flash drive or other portable memory storage device into the media input 15. Also, the user can upload images using an Internet connection through a web site, mobile app, or other similar method.

Figure 4C:
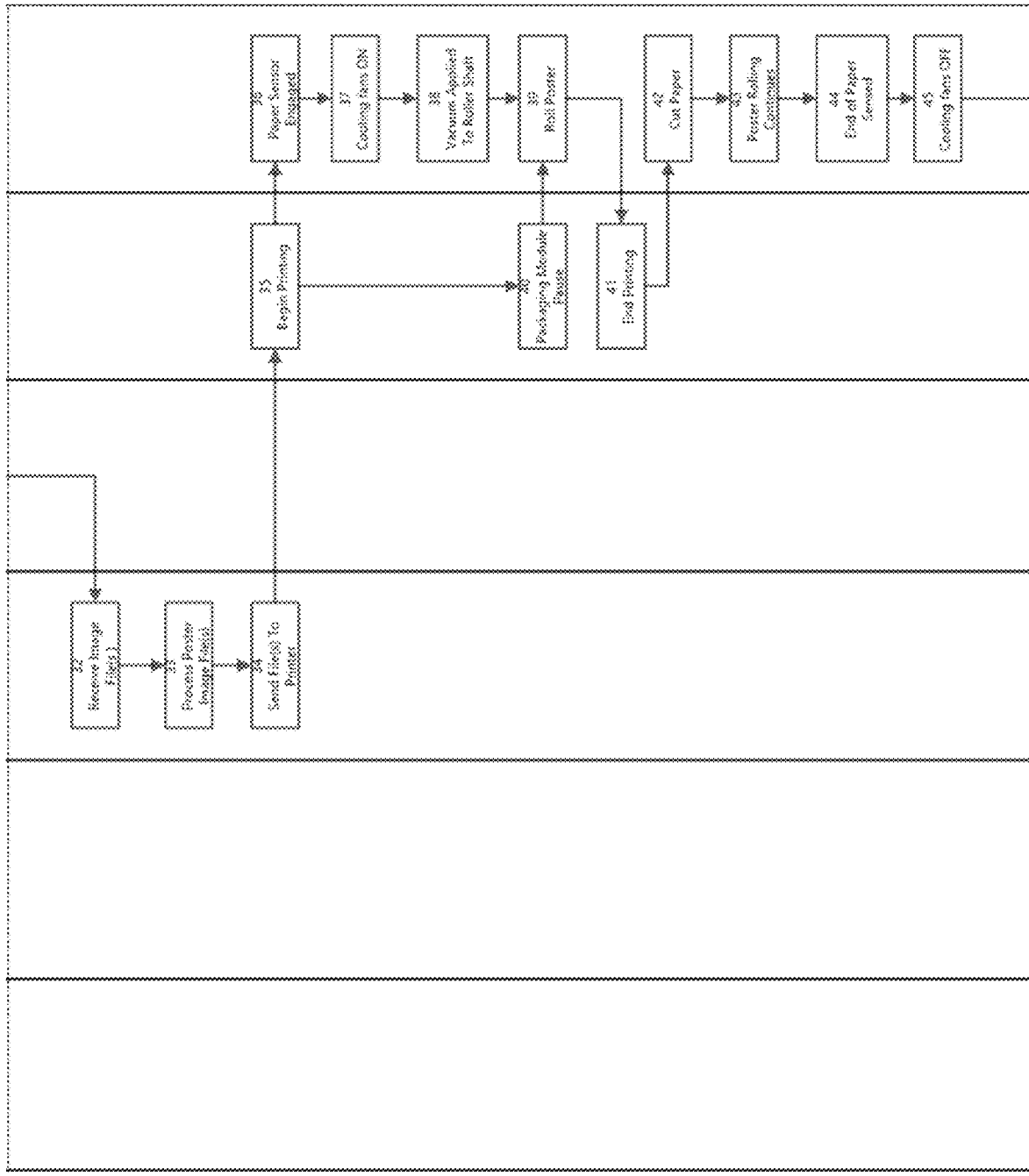
Figure 4D:
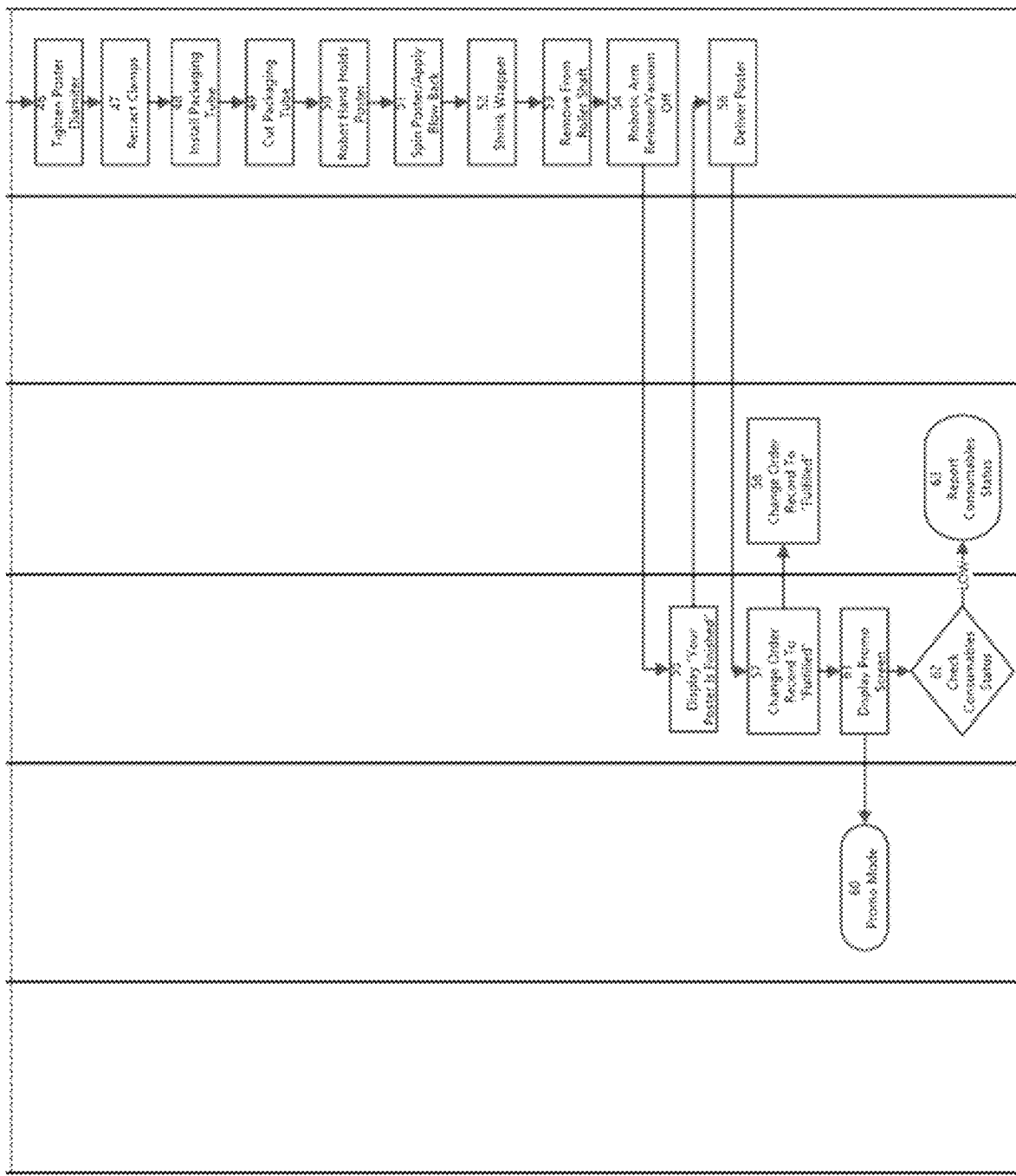

Referring to FIG. 4C, at block 32, the processor 4 will receive the requested image file(s). The processor 4 will receive the encrypted image file(s) required for fulfilling the order from the Centralized Image Server 220. The image file(s) will be temporarily stored in the memory 40. At block 33 the processor 4 will process the image file, including decrypting the image file. The processor 4 will decrypt the image file(s) required for fulfilling the order. At block 34 the processor 4 will send the image file to the Printer 5. Once the image files are decrypted, the processor 4 will submit the image file(s) to the printer 5 for printing.

Figure 5:
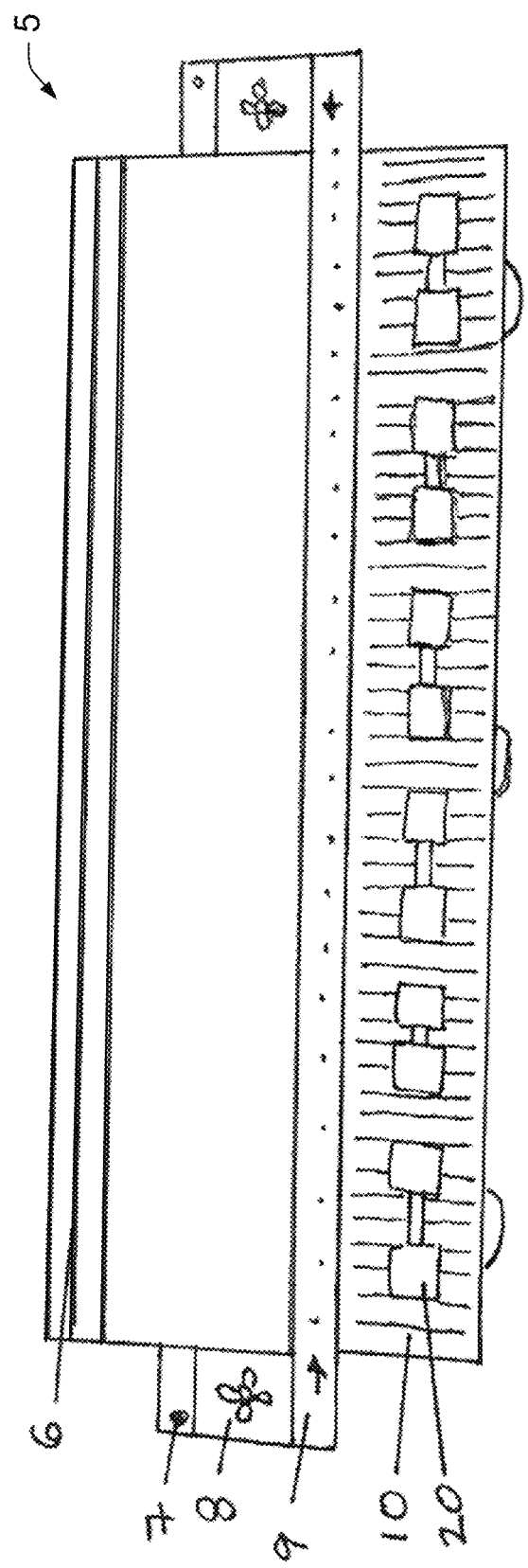
FIG. 5 shows a view of a printer, print cooling system, and associated components, according to an implementation.

Referring also to FIG. 5, at block 35, the printer 5 will begin the Printing Sequence. Once the image file(s) are submitted to the printer 5, printing will begin. At block 36 the Paper Sensor 7 is engaged. As the printing process proceeds, the printer 5 feeds the paper forward into the Poster Guide Track 10 in the Packaging Module 12. When the paper passes over and blocks the optical paper sensor 7, the Packaging Module 12 is activated.

At block 37 the Cooling System Fans 8 are turned ON. When the Packaging Module 12 is activated, the Print Cooling System Fans 8 turn on and force air into a perforated plenum (e.g., tube) 9 that faces the ink side (or toner side) of the printed image. The gentle flow of air cools and fixes the printed image ink to preserve the quality of the print.

Figure 6:
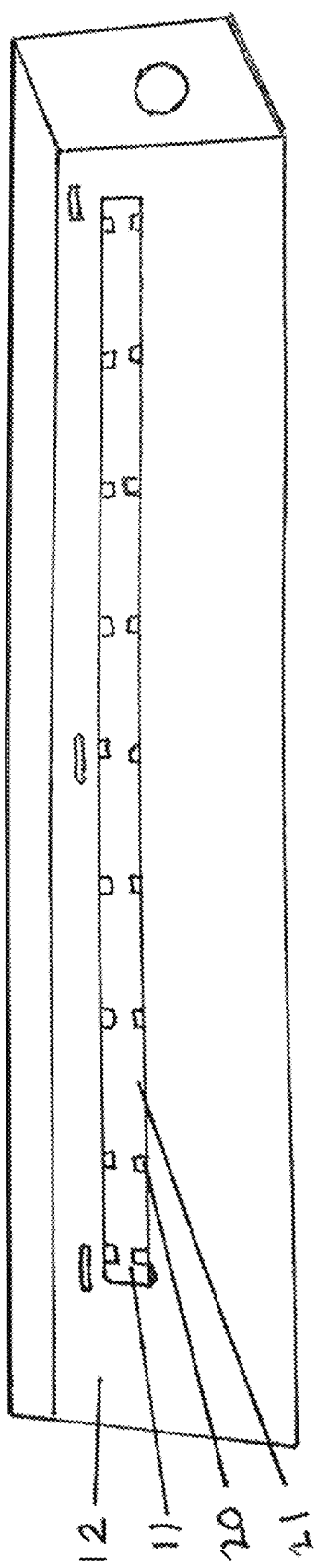
FIG. 6 shows a perspective view of an example packager system and FIG. 7 shows an interior view of the same, according to an implementation.
Figure 7:
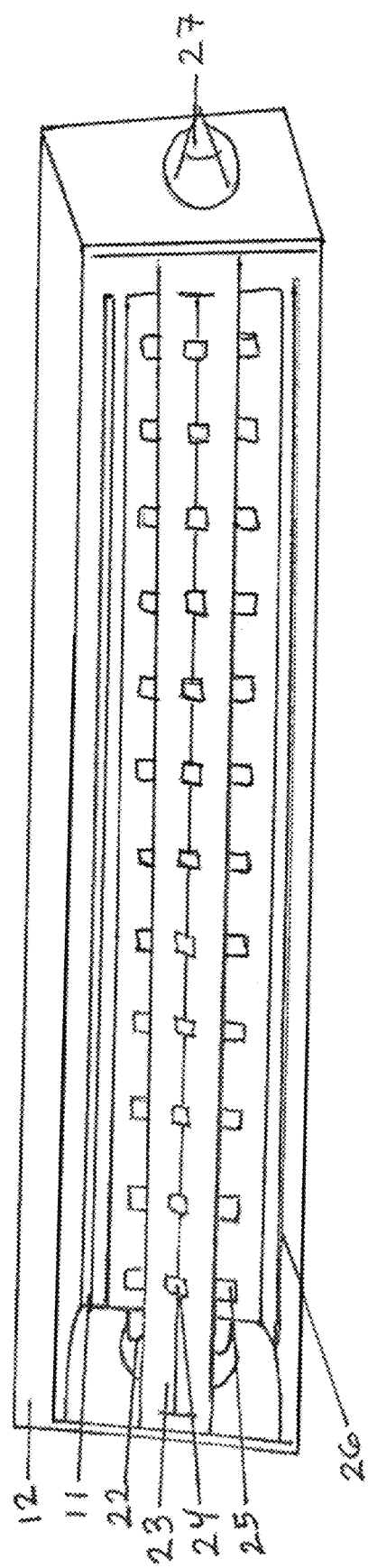
Figure 8:
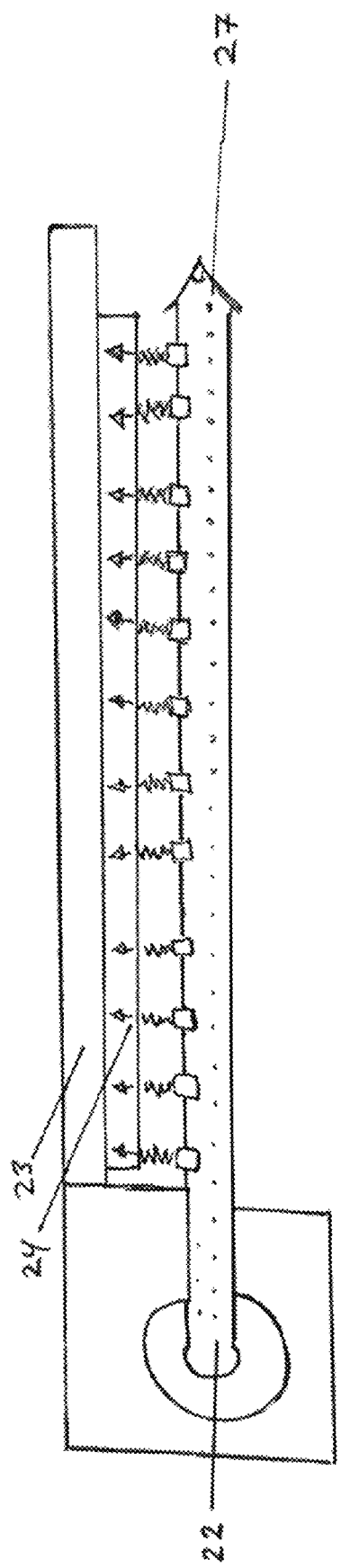
FIG. 8 shows a view of an example vacuum roller shaft and associated components, according to an implementation.
Figure 9C:
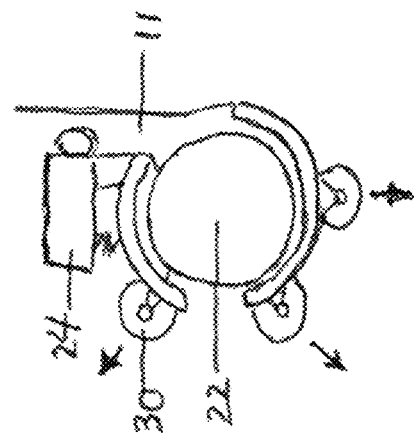
FIGS. 9A-9C show views of an example vacuum roller shaft, shaft clamps, and associated components, according to an implementation.
Figure 9B:
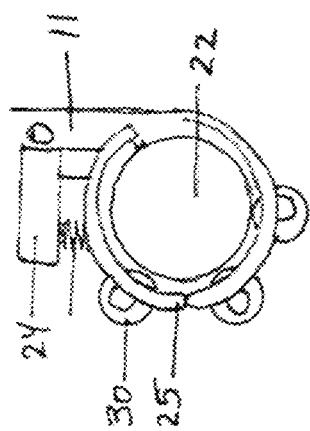
Figure 9A:
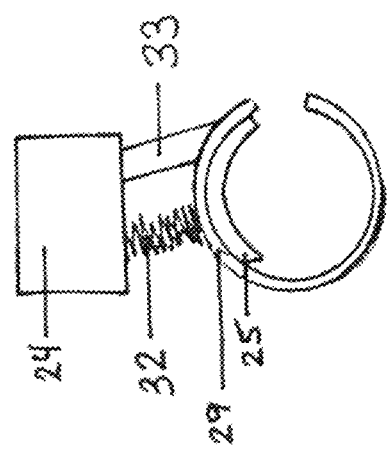

Referring also to FIGS. 6-8, at block 38 vacuum is applied to the Roller Shaft 22. The Roller Shaft 22 is hollowed and has small perforations in the shaft 22 for creating suction and pulling the printed image (e.g., poster) tightly to the shaft 22 for rolling. At block 39 the process includes rolling the printed image. When the Packaging Module 12 is activated, gears that are timed to match the paper output of the printer 5 will turn the Shaft Rod 22 and Paper Guide Rollers 20 that will roll up the image as it is fed from the printer 5. Spring-loaded tension clamps 25 gently hold the image to the shaft 22 for friction to hold the image as it is rolled.

At block 40, the Packaging Module 12 is paused. Shortly before the end of the print job, the packaging module 12 will pause. This will allow the printer cutter 50 to cut the paper without any paper movement. At block 41 the End Printing sequence is initiated by the processor 4. When the print job ends, the printer 5 will cease operation. At block 42 the paper cutter 50 will cut the paper. At the end of the print job, the printer paper cutting mechanism 50 will cut the paper from the paper roll so that the printed image is free to continue to the Packaging Module 12.

At block 43 Image Rolling Continues. After the paper is cut, the Packaging Module 12 is again activated, and the Roller Shaft 22 and Paper Guide Rollers 20 rotate to roll up the image. At block 44 the end of the paper is sensed. When the cut end of the paper passes over the optical sensor 7 and the sensor 7 is no longer blocked, this event signals the Packaging Module 12 to begin the Packaging Sequence. At block 45 the cooling system fans 8 are turned OFF. When the Packaging Sequence begins, and the printing sequence is complete, the cooling system fans 8 are turned off.

Referring to FIG. 4D and FIGS. 9A-9C, block 46 discusses tightening the printed image to a Packaging Diameter. The Vacuum Rolling Shaft 22 continues to rotate until the entire printed image is reduced to a diameter that will allow the packaging tube to fit over the tube of printed paper. When the printed image is at the correct diameter, the rotation of the Vacuum Rolling Shaft 22 and Guide Rollers 20 stops, and the Spring-Loaded Tension Clamps 25 hold the printed image in place from unrolling. At block 47 the clamps 25 are retracted. With the Spring-Loaded Tension Clamps 25 in place holding the printed image (e.g., poster) to the Vacuum Rolling Shaft 22, a set of Guide Roller Shaft Retraction Cams 30 turn and retract or expand the inside diameter of the set of Guide Roller Shafts 27 leaving only the Spring-Loaded Tension Clamps 25 to hold the printed image at the correct diameter for the wrapping tube.

Figure 10:
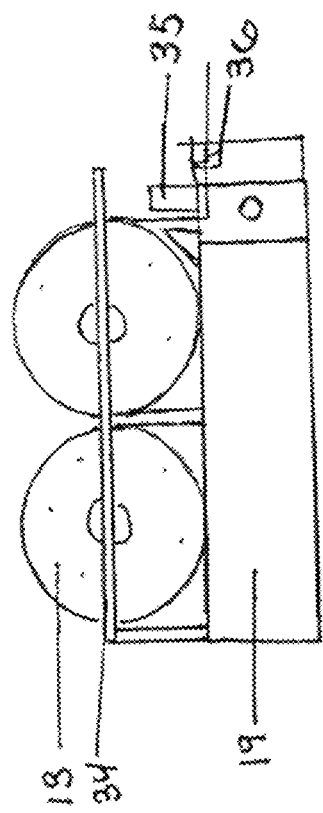
FIGS. 10 and 11 show an example shrink wrap system and associated components, according to an implementation.
Figure 11:
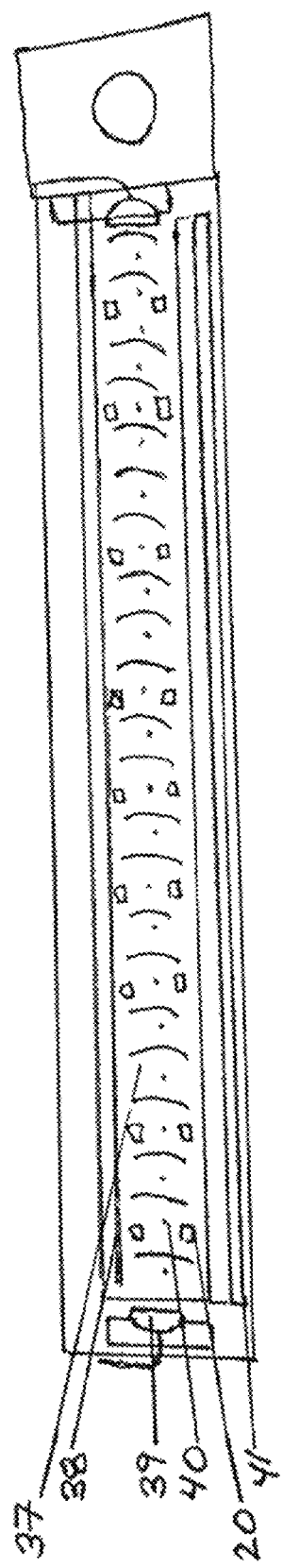
Figure 12:
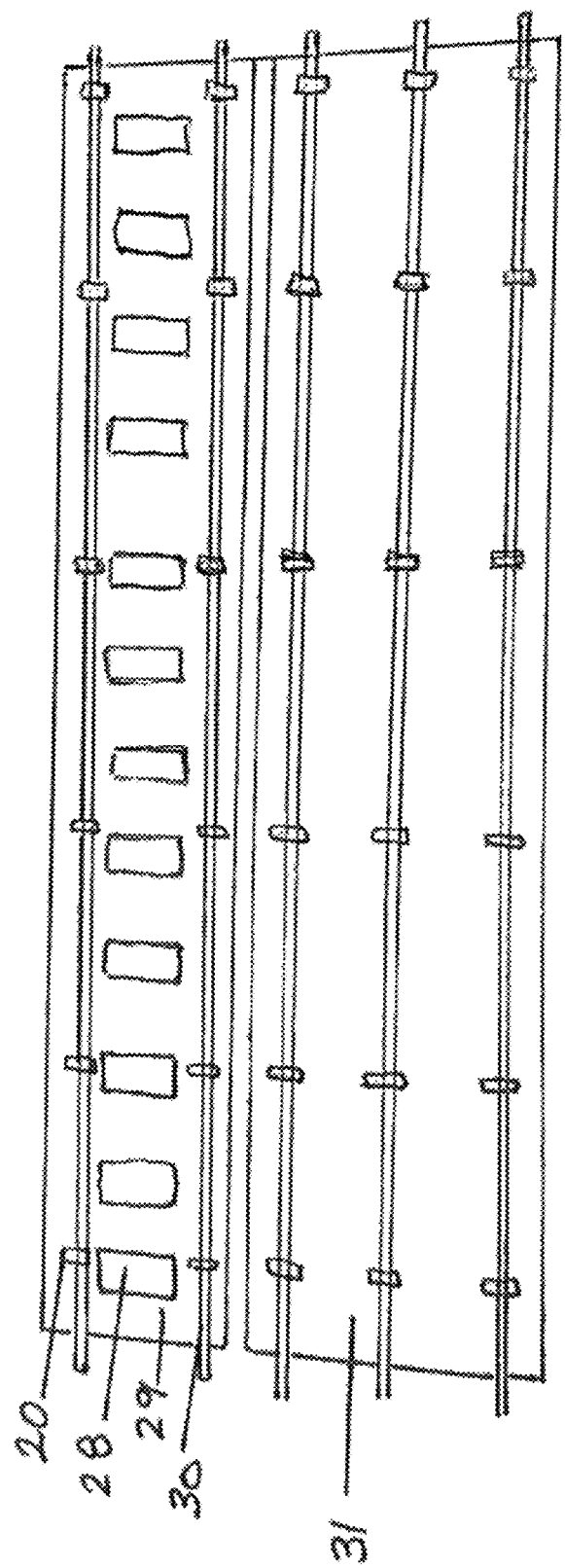
FIG. 12 shows an example rolling system, according to an implementation.
Figure 13B:
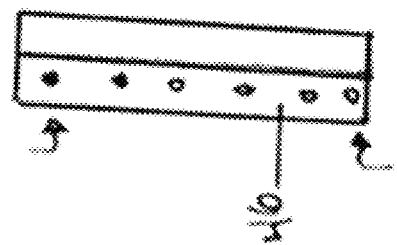
FIGS. 13A and 13B show examples of a robotic hand and associated components, according to an implementation.
Figure 13A:
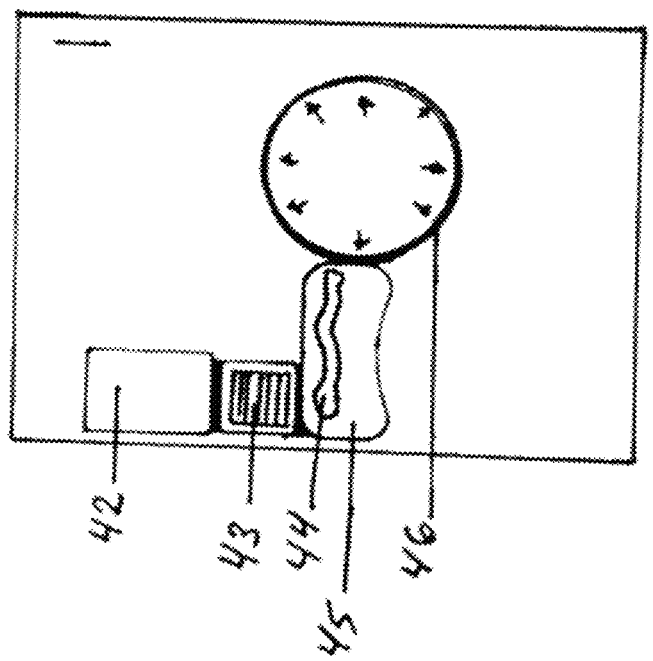
Figure 14:
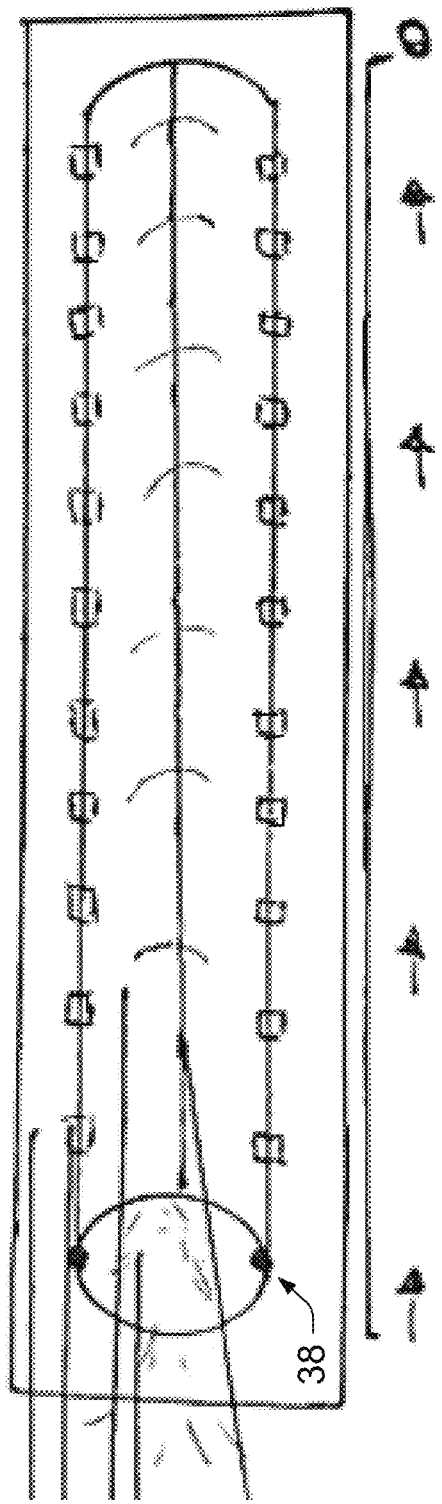
FIG. 14 shows an example vacuum chamber/heat shrink wrapper, according to an implementation.

Referring also to FIGS. 10-12, block 48 discusses installing the Packaging Tube. When the Guide Roller Shaft Retraction Cams 30 turn and the inside diameter of the Guide Roller Shafts 27 reach their maximum range of motion, a robotic "Vacuum Hand" 46 grips the end of the plastic packaging tube 13 that is fed from a roll of plastic tube stock 34. Referring also to FIGS. 13A and 13B, the "Vacuum Hand" 46 pulls the tube 13 over guides that open the plastic packaging tube 13 over the end of the rolled printed image. Then the "Vacuum Hand" 46 continues with the tube 13 down the length of the rolled printed image. As the hand 46 moves over the length of the printed image, the Spring-Loaded Tension Clamps 25 holding the printed image will sequentially release the printed image and retract so that the robotic "Vacuum Hand" 46 will be free to move over the length of the printed image and thus, cover the entire printed image with the plastic tube 13, plus excess on each end. 25.5 inches is an approximation for a 24" wide poster.

At block 49 the process includes cutting the Packaging Tube. When the hand 46 reaches the end of the printed image, the plastic tube 13 will be cut by a Robotic Cutter 36 at the original end with some excess tube at that end and the Tube Stock Reloading Mechanism 35 is moved out of place. At block 50 a robotic hand holds the printed image. Robotic "Vacuum Hand" 46 maintains vacuum pressure on the wrapped/rolled poster tube to keep it in place and for disbursement from the Poster Rolling Chamber 10.

Block 51 describes spinning the printed image/Apply Blow Back. With the Spring-Loaded Tension Clamps 25 retracted and the Packaging Tube 13 installed, the Packaging Module 12 spins the poster with enough centrifugal force to loosen the poster from the Vacuum Roller Shaft 22 while the Vacuum Roller Shaft 22 also applies Blow-Back (e.g., positive air pressure) to the rolled poster. The poster is now free to relax and expand inside the packaging tube 13 making for easy delivery of the product to the Delivery Chamber/Shrink Wrapper 37.

Block 52 discusses the Shrink Wrapper 37. With Blow Back applied at the Vacuum Roller Shaft 22, vacuum is then applied to the Delivery Chamber/Shrink Wrapping system 37. At block 53 the image is removed from the Roller Shaft 22. A Robotic Arm 26 pulls back from the end of the Vacuum Roller Shaft 22 guiding the poster as it slides out the Rolling Chamber 10 and into the "Delivery Chute/Shrink Wrapper" 37. At block 54 the Robotic Arm 26 releases the printed image and the vacuum is turned Off. The Robotic Arm 26 releases the poster at the end of the Delivery Sequence by shutting off vacuum and the poster is sucked to the end of the Delivery Chute/Shrink Wrapper 37 for final preparation.

At block 55 the Reloading Mechanism 35 feeds Tube Stock to Robotic Hand 46. With the Robotic "Vacuum Hand" 46 free, a preloaded mechanism 35 shifts into place and feeds Heat Shrinkable Tube Stock into the "Robotic Hand" 46, slightly covering the beveled head of the Vacuum Roller Shaft 22. At block 56 the Spring-Loaded Tension Clamping Sequencing System Resets. Spring-Loaded Tension Clamps 25 are Reset/Released into position for the next Poster Rolling Sequence.

Block 57 discusses folding the Packaging Tube ends. When the Deliver Chute/Shrink Wrapper 37 has the packaging tube fully installed, robotic "fingers" 39, which are in the open position will close around the open ends of the plastic packaging tube 13 on the printed image, to a size smaller than the inside diameter of the rolled poster tube, and then move inward to the inside of the poster tube to fold the ends of the plastic packaging tube into the poster. At block 58, the process includes sealing the Tube Ends/Heat Shrinking. When the robotic fingers 39 are at the end of their range of motion, a heating element 38 that is part of the robotic finger assembly at each end of the poster tube will energize momentarily to slightly melt and seal the ends of the packaging tube at the ends of the poster. At block 59 the process includes retracting the Packaging Tube Assembly Fingers 39. After the packaging tube sealing process is finished, the robotic fingers 39 will retract.

Block 60 discusses applying a Barcode/Scan Code. As the poster is being rolled out to the Finished Product Delivery Chute 41 a sensor 7 is triggered as the poster rolls by and a Barcode/Scan Code tag is attached to the outside of the Plastic Poster Tube.

Block 61 includes displaying: Your Poster Is Now Finished. Thank You! When the packaging is fully installed on the poster, the interactive display 2 will display: "Your Poster Is Now Finished. Thank You!"

Block 62 includes dropping the rolled and packaged poster into the Delivery Chute 41. When the Robotic Packaging Tube Folding Fingers 39 are retracted, a trap door will be triggered to open to the "Delivery Chute" 41 and the poster will fall by gravity or be rolled into the chute 41 to the outside of the Kiosk 102 for delivery to the customer.

At block 63 the process includes tagging the Kiosk Order Record "Fulfilled". When the poster drops through the Delivery Chute 41, the processor 4 will tag the Kiosk Order Record as "Fulfilled". At block 64 Post Fulfilled Order Transaction to Centralized Transaction Server 210. When the processor 4 tags the Transaction Record as "Fulfilled", the processor 4 will also post a copy of the Fulfilled Transaction Record to the Centralized Transaction Server 210. At this point, the revenue from the transaction will be recognized.

Block 65 includes a return to the Promo Screen. When the processor transfers a copy of the "Fulfilled" Transaction record to the Centralized Transaction Server 210, the interactive display 2 will again display the Promo Screen. At block 66, return to the Promo Mode. When the interactive display 2 displays the Promo Screen, the Kiosk 102 will be in Promo Mode.

Block 67 includes checking the Consumables Status. At the end of a poster printing session, the processor 4 will do a self-diagnostic to determine the status of the consumable items such as paper, ink, and plastic packaging tubing. If a deficiency is found, this data is sent to the Central Management Server 210. At block 68 the processor 4 reports a Consumables Deficiency. When a deficiency report is made by a Kiosk 102, the Central Management Server 210 dispatches a service call to the appropriate personnel.

In various implementations, additional or alternative components, techniques, sequences, or processes may be used to implement the techniques described herein. The components and/or techniques may be arranged and/or combined in various combinations, while resulting in similar or approximately identical results. It is to be understood that the techniques described may be implemented in a stand-alone manner or as part of a larger system (e.g., integrated with other systems, techniques, protocols, etc.).

Example Advantages

The print kiosk and associated system can function as an enhanced poster sales, distribution, dispensing machine within a distribution system to serve consumer demand for posters. However, the system has the benefit of having unlimited units of millions of poster choices made available by the use of a sales, distribution, dispensing machine and its supporting network.

The system can be operated at substantial savings over the costs associated with traditional brick-and-mortar poster sales models. For example, the system does not require hourly employees restocking racks with inventory. Unlike a stock inventory model, the system does not require store staff for assisting with transactions or inventory because all of those type of decisions are made at a centralized location by a management team located remote from the kiosk locations. Unlike a stock inventory model, the system does not require a great deal of physical space. The system will also reduce employee costs while delivering a higher level of service to the consumer. The system never needs training, never needs time off, etc. A further cost benefit of the system is a substantial reduction to the time and expense involved in losses due to shoplifting.

The system has the added advantage of being eco-friendly and being orders of magnitude less taxing on our environment. Unlike the stock-on-the-shelf model, there is no surface shipping for the inventory. Only the paper that is needed is used, i.e., there is no out-of-date inventory to put into the landfills.

The print kiosk, being an electronic and mechanical machine, may have regularly scheduled maintenance by qualified personnel, and also be re-stocked with consumable materials such as ink, paper, and packaging. Routine maintenance issue detection is carried out via diagnostic tests triggered periodically (e.g., at the end of each print job and in the off hours) from a centralized management location. Out of consumables, out of tolerance issues, and systemic failures are easily and more importantly quickly detected by the kiosk/server diagnostic communication and then automatically dispatched to qualified service technicians. The modular design of the system allows the technician to swap out major functional modules in minutes, rather than rather than troubleshooting and replacing individual components. The major functional modules can be shipped to a central repair depot for correction.

The print kiosk's enclosure can store enough ink, paper stock, and packaging tubes for many (e.g., 200+) poster prints. However, an increase in capacity is a matter of enclosure size. The ink, paper, and packaging modules can be replaced in minutes by minimally trained store staff or service personnel.

The print kiosk can include a user-friendly graphical control interface. When the print kiosk is not in active use, a promo mode can display video and audio sound to attract consumers. By utilizing a fully interactive, real-time, Internet-linked website, consumers can purchase one or more posters online to be dispensed from a local print kiosk. This option could also be used for sending gift codes to friends and relatives that they can use to retrieve their gift poster at any local print kiosk. Local print kiosks can be fully networked with each other, and with a system website via satellite links or other networking at each hosting location. Through this linked network, the purchase experience for each consumer can be customized, and further based on a profile for each consumer that is set up when they create an account.

Several aspects of the system distinguish it from conventional options. The system utilizes software designed to provide real-time monitoring of the consumables at each system, and customer history and demographic information. The interactive system website will be linked to the local machines and provide customers with the ability to query machine locations and select posters for purchase.

The system includes a user-friendly website to facilitate the consumer experience. The website permits a consumer to browse posters for viewing and purchase, read reviews and recommendations, locate a machine based on inputting a preferred geographical area such as a particular zip code, enroll as a member, and view promotions. Members can do all the foregoing tasks, and are able to modify their preferences, alter or cancel their membership, and view special members-only promotions. Additionally, existing members can be greeted by a customized homepage which is personalized for each member based on their input preferences and viewing habits (e.g., preferred genres, already viewed posters, etc.). The website can be accessible from a variety of hardware units and in a variety of formats. For example, the website may be accessed from mobile devices and personal computers.

Each print kiosk is a "smart" machine such that each machine has a network adapter, and may have satellite internet uplink that networks all of the machines together through the Internet. Networking the print kiosks coordinates the user experience via the system website, and permits the system administrator to manage all of its operations at a centralized location. The system permits coordinated roll-out of promotional programs across all or select kiosks, real-time feedback from each machine as to its use and functionality, and coordinates distribution of promotional programs across all or select machines.

The system can generate revenue by selling ads for movie posters, food, theme toys, and other select items to play their trailers and/or promotions on the poster display monitors. The trailers and/or promotions can be loaded into the sales, distribution, dispensing machines and stored locally on the kiosk to minimize network traffic. These promotional efforts can be complemented by selling banner ads on the System website and/or ad space on the panels of the sales, distribution, dispensing machines.

The print kiosk 102 and the system 100 are discussed in terms of printing posters, however that is not intended to be limiting. The print kiosk 102 and the system 100 can be utilized for a multitude of printing and related tasks with various media. Although various implementations and examples are discussed herein, further implementations and examples may be possible by combining the features and elements of individual implementations and examples.

In various implementations, components of the print kiosk 102 are comprised of various plastics, composites, metals, woods, combinations of the same, or the like. For example, some components may be injection molded, stamped, formed, or the like. In various embodiments, the components have rigidity and stability properties based on a particular material selected for the components. For example, some materials that may be used include polymers, various metals and alloys, fiber composites, natural and manufactured wood products, combinations of the same, and the like. Additionally, in some embodiments, the stability properties are also based on a thickness of the components.

In various implementations, the print kiosk 102 may include fewer, more, or alternate components, and remain within the scope of the disclosure. In various embodiments, the shape and configuration of the components may vary to accommodate different implements or applications.

The illustrations of FIGS. 1-14 are not intended to be limiting. In the various example embodiments illustrated in FIGS. 1-14, the location and position of the components, mechanisms, and the like are for example only. Other locations and positions are contemplated and are within the scope of this disclosure. In some cases, additional or alternative components, techniques, sequences, or processes may be used to implement the techniques described herein.

Further, the components and/or techniques may be arranged and/or combined in various combinations, while resulting in similar or approximately identical results. In some cases, additional or alternative components, techniques, sequences, or processes may be used to implement the techniques described herein.

CONCLUSION

While various discreet embodiments have been described throughout, the individual features of the various embodiments may be combined to form other embodiments not specifically described. The embodiments formed by combining the features of described embodiments are also within the scope of the disclosure.

What is claimed is:

1. A self-service point-of-sale kiosk, comprising:
   an enclosure;
   a printer disposed within the enclosure;
   at least one roll of paper disposed within the enclosure and configured to be fed into the printer for printing;
   a paper cutter disposed within the enclosure and configured to cut the at least one roll of paper before, during, or after printing by the printer to a predetermined size;
   a print cooling system including a perforated plenum disposed within the enclosure and configured to dry a printed image output from the printer, the print cooling system configured to be activated by the printed image passing a sensor;
   a packaging system disposed within the enclosure, configured to roll the printed image output from the printer onto a roller shaft and to wrap the rolled printed image in a wrapper for delivery, the packaging system configured to be activated by the printed image passing the sensor, and wherein the packaging system uses positive forced air pressure through a perforated tube to move the printed image off of the roller shaft;
   a processor disposed within the enclosure and communicatively coupled to the printer, the processor configured to send a user-selected image to the printer for printing;
   a network adapter communicatively coupled to the processor and configured to wirelessly communicate via the Internet to download the user-selected image for printing;
   a memory disposed within the enclosure and communicatively coupled to the processor, the memory configured to temporarily store the user-selected image for printing;
   a remote database of images communicatively coupled to the processor via the network adapter; and
   an interactive display disposed on the enclosure and communicatively coupled to the processor, the interactive display configured to receive user input and to display text and images from the processor and to relay a user request to the processor for a download from the remote database.

2. The self-service point-of-sale kiosk of claim 1, further comprising a remote server for processing payment transactions, networked to the processor.

3. The self-service point-of-sale kiosk of claim 1, further comprising a remote server for processing image requests, networked to the processor.

4. The self-service point-of-sale kiosk of claim 1, further comprising a payment processing pad configured to receive on-site payments.

5. The self-service point-of-sale kiosk of claim 1, further comprising a media input port configured to receive a portable data storage device and to relay an image from the portable storage device to the processor.

6. The self-service point-of-sale kiosk of claim 1, further comprising a local database of images communicatively coupled to the processor.

7. The self-service point-of-sale kiosk of claim 1, wherein the printer is configured to print a poster with a size of at least 24 inches by 36 inches.

8. The self-service point-of-sale kiosk of claim 1, wherein the print cooling system is triggered to automatically turn off by the printed image.

9. The self-service point-of-sale kiosk of claim 1, wherein the sensor comprises an optical sensor.

10. The self-service point-of-sale kiosk of claim 1, wherein the packaging system further comprises a vacuum to hold the printed image to the roller shaft.

11. A self-service point-of-sale kiosk, comprising:
    an enclosure;
    a printer disposed within the enclosure;
    paper stock disposed within the enclosure and configured to be fed into the printer for printing;
    a paper cutter disposed within the enclosure and configured to cut the paper stock before, during, or after printing by the printer to a predetermined size;
    a print cooling system including a perforated plenum disposed within the enclosure and configured to dry a printed image output from the printer, the print cooling system configured to be activated by the printed image passing a sensor;
    a packaging system disposed within the enclosure, configured to roll the printed image output from the printer onto a roller shaft and to wrap the rolled printed image in a wrapper for delivery, the packaging system configured to be activated by the printed image passing the sensor, and wherein the packaging system further comprises a vacuum to hold the printed image to the roller shaft;
    a processor disposed within the enclosure and communicatively coupled to the printer, the processor configured to send a user-selected image to the printer for printing;
    a network adapter communicatively coupled to the processor and configured to wirelessly communicate via the Internet to download the user-selected image for printing;
    a memory disposed within the enclosure and communicatively coupled to the processor, the memory configured to temporarily store the user-selected image for printing;
    a remote database of images communicatively coupled to the processor via the network adapter; and
    an interactive display disposed on the enclosure and communicatively coupled to the processor, the interactive display configured to receive user input and to display text and images from the processor and to relay a user request to the processor for a download from the remote database.

12. The self-service point-of-sale kiosk of claim 11, wherein the paper stock comprises bulk rolled-paper stock that is at least 24 inches wide, and wherein the printer is configured to accept the rolled-paper stock.

13. The self-service point-of-sale kiosk of claim 11, wherein the packaging system uses positive forced air pressure through a perforated tube to move the printed image off of the roller shaft.

14. The self-service point-of-sale kiosk of claim 11, wherein the packaging system further comprises cammed rollers to wrap the printed image in shrink wrapping.

15. The self-service point-of-sale kiosk of claim 11, wherein the processor is configured to receive encrypted image files and to decrypt the encrypted image files prior to relaying the decrypted image files to the printer for printing.

16. The self-service point-of-sale kiosk of claim 11, wherein the network adapter is configured for satellite communication.

17. The self-service point-of-sale kiosk of claim 11, wherein the interactive display comprises a touch screen.

18. The self-service point-of-sale kiosk of claim 11, wherein the kiosk is networked to at least one other equivalent kiosk.

19. A self-service point-of-sale kiosk, comprising:
   an enclosure;
   a printer disposed within the enclosure;
   at least one roll of paper disposed within the enclosure and configured to be fed into the printer for printing;
   a paper cutter disposed within the enclosure and configured to cut the at least one roll of paper before, during, or after printing by the printer to a predetermined size;
   a print cooling system including a perforated plenum disposed within the enclosure and configured to dry a printed image output from the printer, the print cooling system configured to be activated by the printed image passing a sensor;
   a packaging system disposed within the enclosure, configured to roll the printed image output from the printer onto a roller shaft, and to wrap the rolled printed image in a wrapper for delivery, the packaging system configured to be activated by the printed image passing the sensor, and wherein the packaging system further comprises a vacuum to hold the printed image to the roller shaft;
   a processor disposed within the enclosure and communicatively coupled to the printer, the processor configured to send a user-selected image to the printer for printing;
   a network adapter communicatively coupled to the processor and configured to wirelessly communicate via the Internet to download the user-selected image for printing;
   a memory disposed within the enclosure and communicatively coupled to the processor, the memory including a local database of user-selectable images, the memory further configured to temporarily store the user-selected image for printing;
   a remote database of images communicatively coupled to the processor via the network adapter; and
   an interactive display disposed on the enclosure and communicatively coupled to the processor, the interactive display configured to receive user input and to display text and images from the processor and to relay a user request to the processor for a download from the remote database.

20. The self-service point-of-sale kiosk of claim 19, further comprising a barcode reader disposed within the enclosure and communicatively coupled to the processor, the barcode reader configured to read a barcode affixed to the wrapped printed image as the wrapped printed image is dispensed from the enclosure.

\* \* \* \* \*